US012802464B2

(12) United States Patent
Bang

(10) Patent No.: US 12,802,464 B2
(45) Date of Patent: Nov. 17, 2026

(54) LANE DETECTION APPARATUS AND METHOD THEREOF

(71) Applicants: HYUNDAI MOTOR COMPANY, Seoul (KR); KIA CORPORATION, Seoul (KR)

(72) Inventor: Yoon Bang, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 19/095,549

(22) Filed: Mar. 31, 2025

(65) Prior Publication Data

US 2026/0038282 A1 Feb. 5, 2026

(30) Foreign Application Priority Data

Aug. 2, 2024 (KR) ........................ 10-2024-0103377

(51) Int. Cl.
*G06V 20/58* (2022.01)
*G06V 10/25* (2022.01)
*G06V 10/26* (2022.01)
*G06V 10/75* (2022.01)
*G06V 10/98* (2022.01)
*G06V 20/56* (2022.01)

(52) U.S. Cl.
CPC ............ *G06V 20/588* (2022.01); *G06V 10/25* (2022.01); *G06V 10/26* (2022.01); *G06V 10/751* (2022.01); *G06V 10/98* (2022.01)

(58) Field of Classification Search
None
See application file for complete search history.

(56) References Cited

U.S. PATENT DOCUMENTS

2023/0052842 A1* 2/2023 Cai ........................ G06V 10/24

* cited by examiner

*Primary Examiner* — Samira Monshi
(74) *Attorney, Agent, or Firm* — Lempia Summerfield Katz LLC

(57) ABSTRACT

A lane detection apparatus includes storage for storing data and computer-readable instructions. The lane detection apparatus also includes a processor configured to execute the computer-readable instructions to generate a lane image based on semantic segmentation data including semantic information for a lane, detect the lane using a plurality of feature points extracted from the lane image, generate one or more instance for the lane, and correct a lane detection error based on the one or more instances.

20 Claims, 9 Drawing Sheets

LANE DETECTION APPARATUS AND METHOD THEREOF

CROSS-REFERENCE TO RELATED APPLICATION

This application claims the benefit of and priority to Korean Patent Application No. 10-2024-0103377, filed in the Korean Intellectual Property Office on Aug. 2, 2024, the entire contents of which are hereby incorporated herein by reference.

TECHNICAL FIELD

The present disclosure relates to a lane detection apparatus and a method thereof, and more particularly, relates to technologies for generating an instance for a lane detected from semantic segmentation-based lane data and correcting a lane detection error based on the instance.

BACKGROUND

Driving assistance systems for the convenience of a driver have been loaded into a vehicle. More various types of driving assistance systems have been developed.

Thus, a lane detection technology for assisting with the driving of the vehicle has become advanced. The lane detection technology is a technology for assisting a driver based on lane detection using a camera in the vehicle, in a situation in which it is difficult to identify a lane using the naked eye at night. Furthermore, the lane detection technology is used to identify a driving situation even during autonomous driving of the vehicle.

The lane detection technology detects a lane based on a camera image and may control a steering system based on the detected lane, thus performing a function, such as lane departure prevention and a lane change.

However, it is difficult to cope with a case in which an error occurs in a camera-based lane detection system or a situation in which it is difficult to perform forward detection using the camera.

Thus, lane detection software has been developed.

However, a semantic segmentation database (DB) for a lane should be constructed to implement the lane detection software. Constructing the semantic segmentation DB is typically time consuming and costly. Furter, an error in the lane detection result may occur when lane detection is performed based on semantic segmentation data.

The statements in this Background section merely provide background information related to the present disclosure and may not constitute prior art.

SUMMARY

The present disclosure has been made to solve the above-mentioned problems occurring in the prior art while advantages achieved by the prior art are maintained intact.

Aspects of the present disclosure provide a lane detection apparatus for detecting a lane based on semantic segmentation data including semantic information about the lane and generating an instance for the detected lane to detect a lane detection error and a method thereof.

Other aspects of the present disclosure provide a lane detection apparatus for removing a misrecognized lane or correcting a location and an angle of an instance for a lane based on a lane instance to update semantic segmentation when a lane detection error is detected based on the instance, to improve the accuracy of lane detection and minimize cost and time required to construct data and a method thereof.

The technical problems to be solved by the present disclosure are not limited to the aforementioned problems. Other technical problems not mentioned herein should be more clearly understood from the following description by those of ordinary skill in the art to which the present disclosure pertains.

According to an aspect of the present disclosure, a lane detection apparatus is provided. The lane detection apparatus includes storage storing data and computer-readable instructions. The lane detection apparatus also includes a processor configured to execute the computer-readable instruction to generate a lane image based on semantic segmentation data including semantic information for a lane, detect the lane using a plurality of feature points extracted from the lane image, generate one or more instances for the detected lane, and correct a lane detection error based on the one or more instances.

In an embodiment, the processor may be configured to set regions of interest for the lane based on a starting point and an end point of polylines generated using the plurality of feature points. The processor may further be configured to assign an instance ID to lane pixels in a region of interest to generate an instance for the lane.

In an embodiment, the processor may be configured to detect the lane detection error based on a length and a width of an instance, among the one or more instances, generated for the lane.

In an embodiment, the processor may be configured to detect the lane detection error for an instance, among the one or more instances, meeting i) a first condition in which an instance length from a top-left pixel of the instance to a top-right pixel of the instance meets a predetermined minimum length criterion and ii) a second condition in which an instance width from the top-left pixel of the instance to a bottom-left pixel of the instance meets a predetermined minimum width criterion.

In an embodiment, the processor may be configured to remove lane classes of semantic segmentation in a region of interest, among the regions of interest, that includes an instance in which the lane detection error is detected.

In an embodiment, the processor may be configured to generate a region of interest group based on a distance and an angle between the regions of interest. The processor may be configured to include regions of interest within a certain distance and a certain angle in the region of interest group.

In an embodiment, the processor may be configured to identify two regions of interest as neighboring regions of interest based on determining that a distance between vertices of the two regions of interest is within the certain distance and an angle formed by diagonals of the two regions of interest is within a certain angle range.

In an embodiment, the processor may be configured to calculate an average location and an average angle of instances belonging to the region of interest group. The processor may be configured to correct a location and an angle of each of the instances belonging to the region of interest group.

In an embodiment, the processor may be configured to set the region of interest to a rectangle. The processor may also be configured to determine top-left vertex coordinates for each of the regions of interest based on a smaller value between an x-coordinate of the starting point of the polylines and an x-coordinate of the end point of the polylines and a minimum margin value of a y-coordinate of the starting point of the polylines and a y-coordinate of the end point of the polylines. The processor may further be configured to determine bottom-right vertex coordinates for each of the regions of interest based on a larger value between the x-coordinate of the starting point of the polylines and the x-coordinate of the end point of the polylines and a maximum margin value of the y-coordinate of the starting point of the polylines and the y-coordinate of the end point of the polylines.

In an embodiment, the processor may be configured to update the semantic segmentation data based on an instance in which the lane detection error is corrected. The processor may also be configured to train a semantic segmentation deep learning model based on the updated semantic segmentation data. The processor may further be configured to detect the lane based on the trained semantic segmentation deep learning model.

According to another aspect of the present disclosure, a lane detection method is provided. The lane detection method includes generating a lane image based on semantic segmentation data including semantic information for a lane. The lane detection method also includes detecting the lane using a plurality of feature points extracted from the lane image. The lane detection method further includes generating one or more instances for the detected lane. The lane detection method additionally includes correcting a lane detection error based on the one or more instances.

In an embodiment, generating the one or more instances for the lane may include setting regions of interest for the lane based on a starting point and an end point of polylines generated using the plurality of feature points, and assigning an instance ID to lane pixels in a region of interest to generate an instance for the lane.

In an embodiment, the lane detection method may further include detecting the lane detection error based on a length and a width of an instance, among the one or more instances, generated for the lane.

In an embodiment, detecting the lane detection error may include detecting the lane detection error for an instance, among the one or more instances, meeting i) a first condition in which an instance length from a top-left pixel of the instance to a top-right pixel of the instance meets a predetermined minimum length criterion and ii) a second condition in which an instance width from the top-left pixel of the instance to a bottom-left pixel of the instance meets a predetermined minimum width criterion.

In an embodiment, correcting the lane detection error may include removing lane classes of semantic segmentation in a region of interest that includes the instance in which the lane detection error is detected.

In an embodiment, the lane detection method may further include generating a region of interest group based on a distance and an angle between the regions of interest. Generating the region of interest group may include grouping regions of interest within a certain distance and a certain angle to generate the region of interest group.

In an embodiment, generating the region of interest group may include identifying two regions of interest as neighboring regions of interest based on determining that a distance between vertices of the two regions of interest is within the certain distance and an angle formed by diagonals of the two regions of interest is within a certain angle range.

In an embodiment, correcting the lane detection error may include calculating an average location and an average angle of instances belonging to the region of interest group and correcting a location and an angle of each of the instances belonging to the region of interest group.

In an embodiment, setting the region of interest may include determining top-left vertex coordinates for each of the regions of interest based on a smaller value between an x-coordinate of the starting point of the polylines and an x-coordinate of the end point of the polylines and a minimum margin value of a y-coordinate of the starting point of the polylines and a y-coordinate of the end point of the polylines. Setting the region of interest may also include determining bottom-right vertex coordinates for each of the regions of interest based on a larger value between the x-coordinate of the starting point of the polylines and the x-coordinate of the end point of the polylines and a maximum margin value of the y-coordinate of the starting point of the polylines and the y-coordinate of the end point of the polylines.

In an embodiment, the lane detection method may further include updating the semantic segmentation data based on an instance in which the lane detection error is corrected. The lane detection method may also include training a semantic segmentation deep learning model based on the updated semantic segmentation data. The lane detection method may further include detecting the lane based on the trained semantic segmentation deep learning model.

BRIEF DESCRIPTION OF THE DRAWINGS

The above and other objects, features, and advantages of the present disclosure should be more apparent from the following detailed description taken in conjunction with the accompanying drawings, in which.

DETAILED DESCRIPTION

Figure 1:
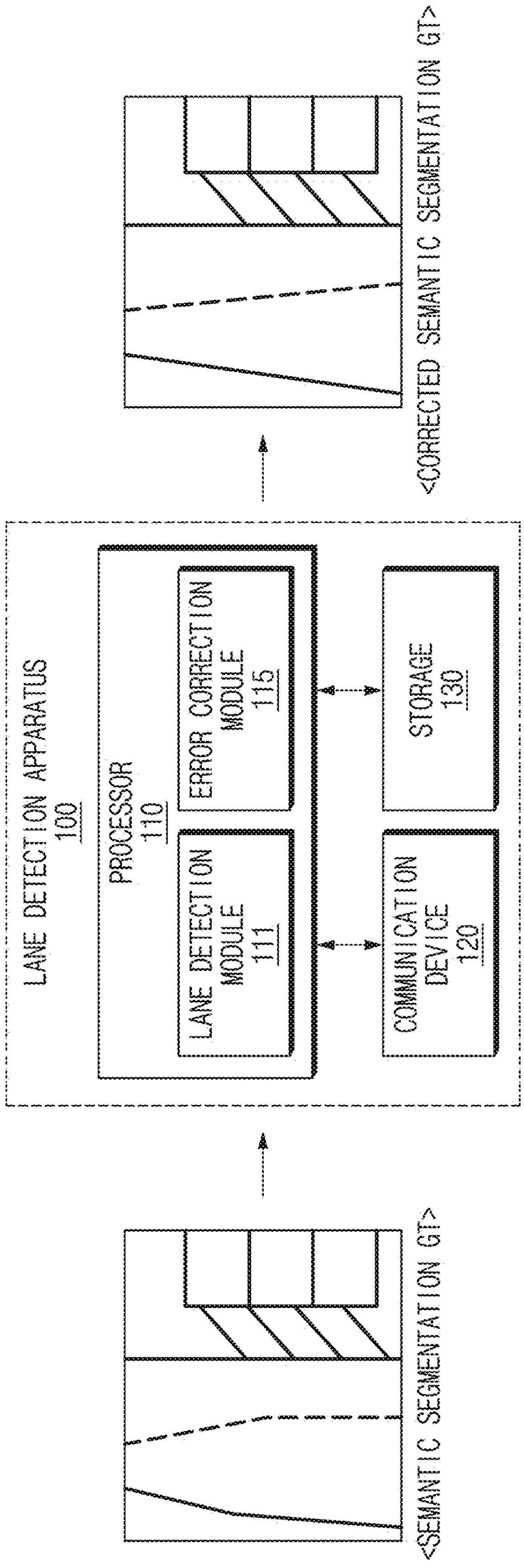
FIG. 1 is a drawing illustrating a configuration of a lane detection apparatus according to an embodiment of the present disclosure.

Hereinafter, embodiments of the present disclosure are described in detail with reference to the accompanying drawings. In adding the reference numerals to the components of the drawings, it should be noted that the identical components are designated by the identical numerals even when the components are displayed on different drawings. Further, in describing the embodiments of the present disclosure, a detailed description of well-known features or functions has been omitted where it was determined that the detailed description would unnecessarily obscure the gist of the present disclosure.

In describing the components of the embodiments according to the present disclosure, terms such as "first", "second", "A", "B", "(a)", "(b)", and the like may be used. These terms are merely intended to distinguish one component from another component. The terms do not limit the nature, sequence, or order of the corresponding components. Furthermore, unless otherwise defined, all terms including technical and scientific terms used herein have the same meaning as being generally understood by those having ordinary skill in the art to which the present disclosure pertains. Such terms as those defined in a generally used dictionary should be interpreted as having meanings equal to the contextual meanings in the relevant field of art, and should not be interpreted as having ideal or excessively formal meanings unless clearly defined as having such in the present disclosure.

When a component, controller, device, element, apparatus, or the like of the present disclosure is described as having a purpose or performing an operation, function, or the like, the component, controller, device, element, apparatus, or the like should be considered herein as being "configured to" meet that purpose or to perform that operation or function.

Figure 2A:
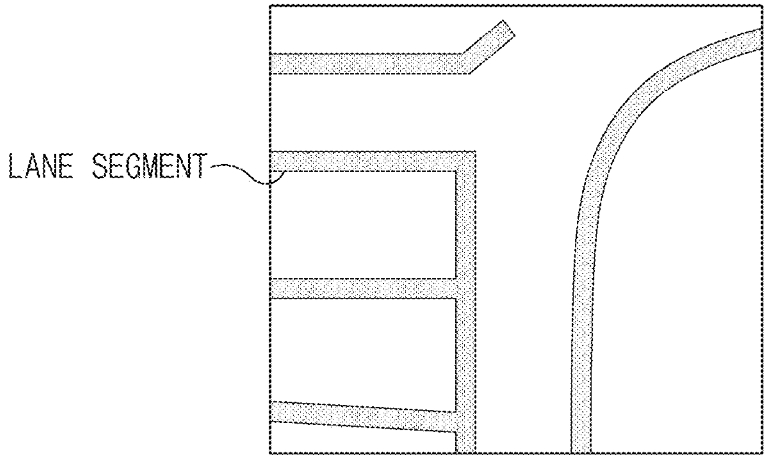
FIGS. 2A, 2B, and 2C are drawings referenced to describe a lane detection operation according to an embodiment of the present disclosure.
Figure 2B:
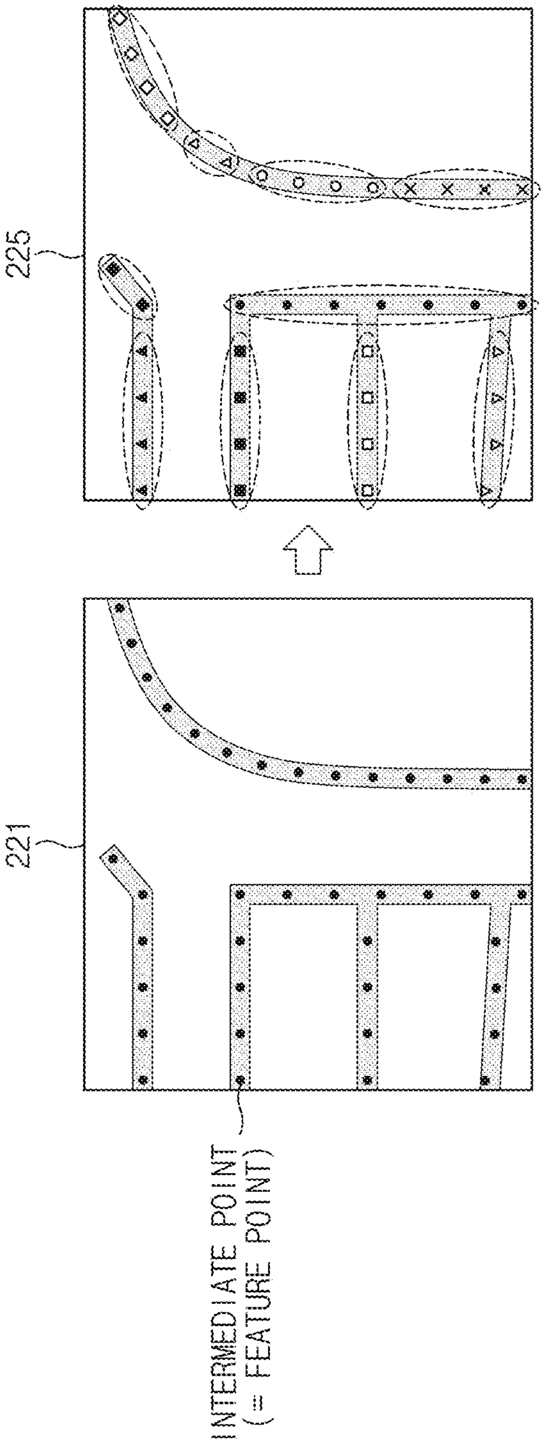
Figure 2C:
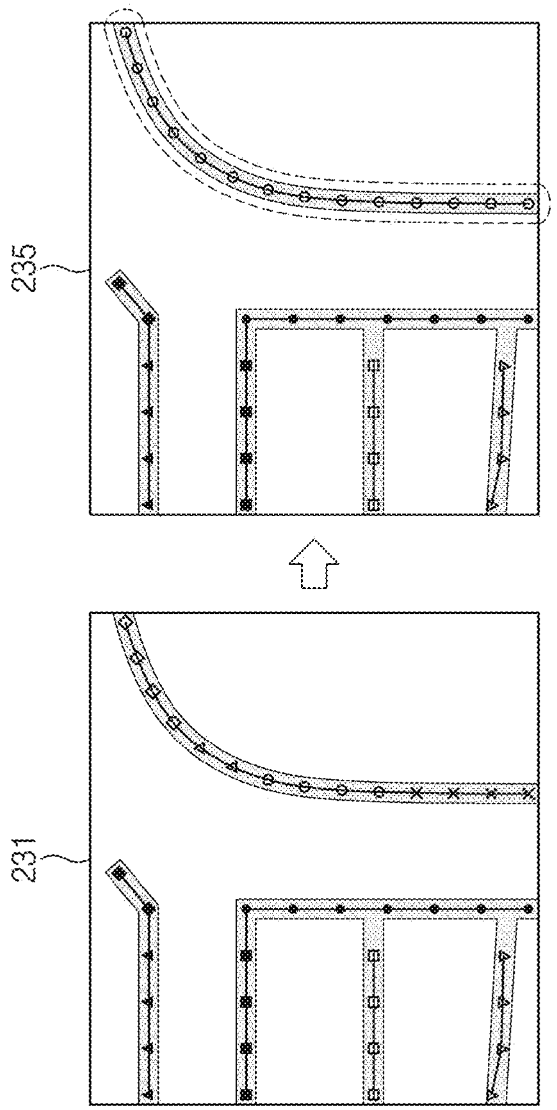
Figure 3A:
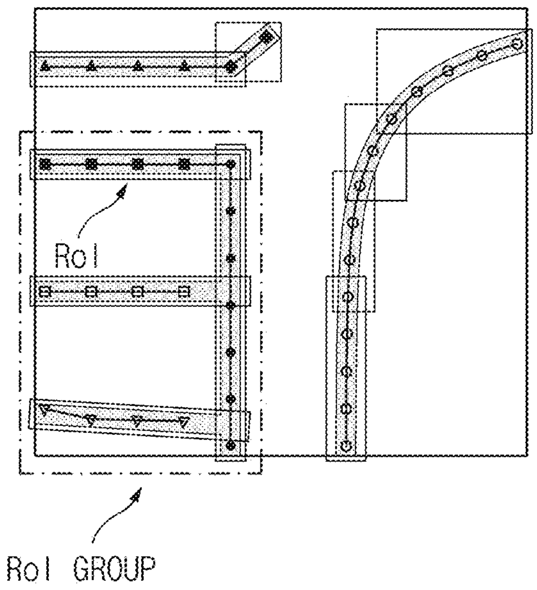
FIGS. 3A and 3B are drawings referenced to describe a lane error correction operation according to an embodiment of the present disclosure.
Figure 3B:
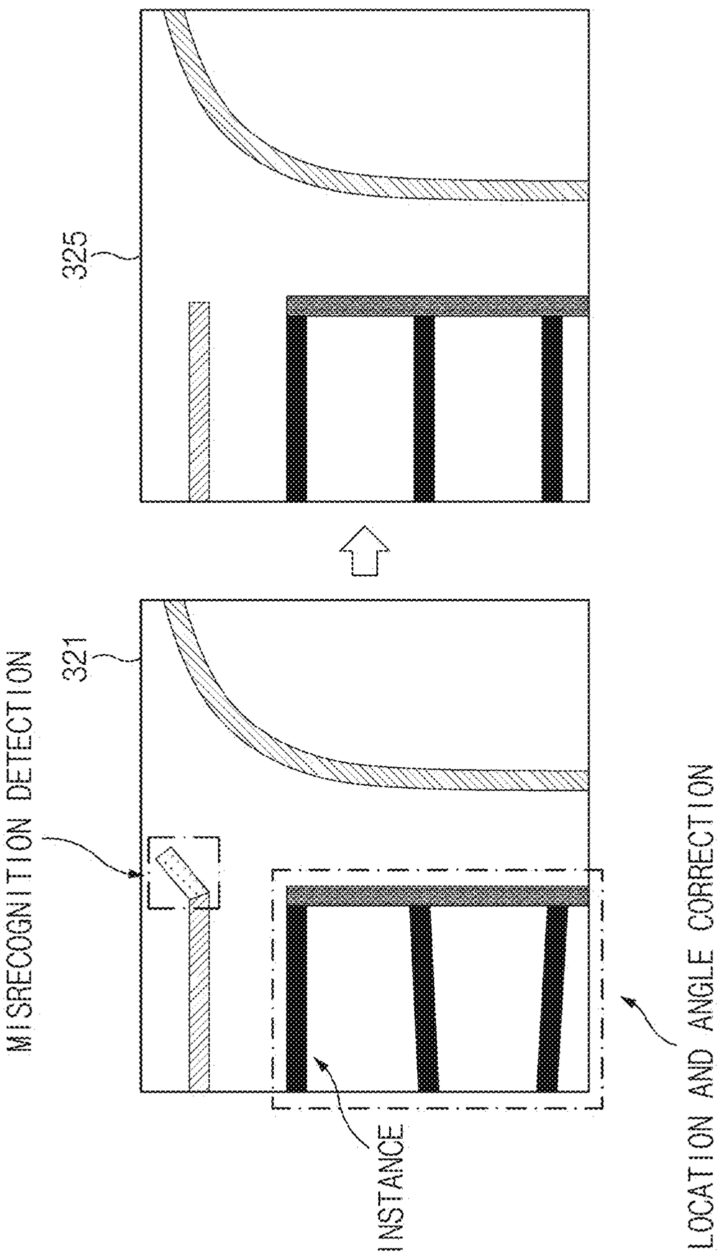

Hereinafter, embodiments of the present disclosure ware described in detail with reference to the accompanying drawings. FIG. 1 is a drawing illustrating a configuration of a lane detection apparatus according to an embodiment of the present disclosure. FIGS. 2A-2C are drawings referenced to describe a lane detection operation according to an embodiment of the present disclosure. FIGS. 3A and 3B are drawings referenced to describe a lane error correction operation according to an embodiment of the present disclosure.

Referring to FIG. 1, a lane detection apparatus 100 may include a processor 110, a communication device 120, and storage 130.

The communication device 120 may be a hardware device implemented with various electronic circuits to transmit and receive a signal via a wireless or wired connection. The communication device 120 may transmit and receive information to/from devices in a vehicle based on a network communication technology in the vehicle.

In various embodiments, the network communication technology in the vehicle may include controller area network (CAN) communication, local interconnect network (LIN) communication, Flex-Ray communication, or the like.

Furthermore, the communication device 120 may further include a communication module for wireless Internet access and/or a communication module for short range communication.

As an example, the communication device 120 may receive semantic segmentation data including semantic information for a lane from a semantic segmentation database (DB) (not shown).

Herein, semantic segmentation may refer to segmenting an image into several classes or categories. For example, the semantic segmentation may segment the image into the several classes, such as a road, a vehicle, and a lane.

The storage 130 may store data, an algorithm in the form of computer-readable instructions, and/or the like necessary for an operation of the processor 110. As an example, the storage 130 may store a lane image generated based on the semantic segmentation data called (i.e., requested, obtained, etc.) from the semantic segmentation DB, feature point information and lane detection information detected by the processor 110 from the lane image, an instance ID assigned to each lane, instance-based error detection information, error correction information, and the like, and/or may store an algorithm in the form of computer-readable instructions for extracting and correcting each of pieces of information from the lane image based on the semantic segmentation data.

In various embodiments, the storage 130 may include at least one type of storage medium such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, or an optical disk.

The processor 110 may be electrically connected with the communication device 120, the storage 130, or the like and may electrically control the respective components. The processor 110 may be an electrical circuit that executes instructions of software and may perform a variety of data processing and calculation described below.

The processor 110 may process a signal delivered between the respective components of the lane detection apparatus 100. The processor 110 may be, for example, an electronic control unit (ECU), a micro controller unit (MCU), or another sub-controller, in a vehicle.

The processor 110 may access the semantic segmentation DB via the communication device 120 and may call semantic segmentation data including semantic information for a lane. As an example, the semantic segmentation data may be a semantic segmentation image.

The processor 110 may detect a lane from the semantic segmentation image obtained from the semantic segmentation DB and may correct an error in the detected lane, when the error occurs. The processor 110 may include a lane detection module 111 and an error correction module 115. Each of the lane detection module 111 and the error correction module 115 may be implemented in the form of an independent module or may be implemented in the form of integrating a plurality of modules into one. Each of these modules or the like may separately embody or be included with a processor and a memory, such as a non-transitory computer readable media, as part of the module.

The lane detection module 111 may extract an edge, a feature point, or the like for a lane. The lane detection module 111 may generate a polyline based on the extracted feature point, and may detect the lane.

The lane detection module 111 may detect the lane based on a semantic segmentation deep learning model.

For example, when semantic segmentation data for the lane is input, the lane detection module 111 may separate a lane class region from the semantic segmentation data and may generate a lane image based on the separated lane class region. The lane image may be a binary image. An embodiment of the lane image generated based on the lane class region separated from the semantic segmentation data is illustrated in FIG. 2A.

The lane detection module 111 may detect an edge of each lane region based on the lane image.

The lane detection module 111 may extract a feature point of each lane on the basis of the edge of each lane region that is detected from the lane image. In an embodiment, the lane detection module 111 may search for a feature point on the basis of the edge of each lane region and may extract an intermediate point in a width direction of the lane as a feature point. The lane detection module 111 may sequentially extract a feature point at a certain interval in a length direction of the lane. Feature points 221 extracted for lane regions, according to an embodiment, are illustrated in FIG. 2B.

The lane detection module 111 may calculate a distance and an angle between feature points for each lane region and may form a feature point group based on feature points that have similar locations and similar angles. The lane detection module 111 may determine whether the feature points detected for each lane region meet a first condition below and a second condition below to form a feature point group.

<First Condition>

$$distPoint(P_{n-1}, P_n) < maxDistThreshold_1$$

Herein, $P_n$ refers to the nth feature point coordinates ($X_n$, $Y_n$), $P_{n-1}$ refers to the n−1th feature point coordinates ($x_{n-1}$, $Y_{n-1}$), distPoint( ) refers to the distance between the two feature points ($P_{n-1}$, $P_n$), and $maxDistThreshold_1$ refers to the maximum distance reference value set for the distance between the two feature points.

In other words, if the distance between the two feature points ($P_{n-1}$, $P_n$) is less than (or close to) the maximum distance reference value, the lane detection module 111 may determine that the first condition is met.

<Second Condition>

$$angLine(\overline{P_{n-2}P_{n-1}}, \overline{P_{n-1}P_n}) < maxAngThreshold_1$$

Herein, $P_n$ refers to the nth feature point coordinates ($X_n$, $Y_n$), $P_{n-1}$ refers to the n−1th feature point coordinates ($X_{n-1}$, $Y_{n-1}$), $P_{n-2}$ refers to the n−2th feature point coordinates ($X_{n-2}$, $Y_{n-2}$), $$\overline{P_{n-1}P_n}$$

refers to the segment connecting the two feature points ($P_{n-1}$, $P_n$), angLine( ) refers to the angle formed by the two straight lines $$\overline{P_{n-2}P_{n-1}} \text{ and } \overline{P_{n-1}P_n},$$

and $maxAngThreshold_1$ refers to the maximum angle reference value set for the angle between the two straight lines.

In other words, if the angle formed by the two straight lines $$\overline{P_{n-2}P_{n-1}} \text{ and } \overline{P_{n-1}P_n}$$

is less than (or close to) the maximum angle reference value, the lane detection module 111 may determine that the second condition is met.

Herein, if the distance and the angle between the feature points extracted for each lane region meet both the first condition and the second condition, the lane detection module 111 may form the feature points to be included in the same group Feature point groups 225 for lane regions, according to an embodiment, are illustrated in FIG. 2B.

In an embodiment, the feature points that belong to each feature point group may have sequence numbers in an order in which they belong to the feature point group. Thus, the lane detection module 111 may define a starting point and an end point depending on the sequence numbers of the feature points that belong to each feature point group.

The lane detection module 111 may generate a polyline for each feature point group. Herein, the polyline refers to a line sequentially connecting feature points which belong to each group, for each feature point group. As an example, the lane detection module 111 may apply a Douglas-Peucker algorithm for each group of feature points to generate a polyline. Herein, the Douglas-Peucker algorithm may be an algorithm for approximating an outline, which may approximate a curve composed of a plurality of segments connecting vertices to a similar curve with fewer vertices. Polylines 231 generated for feature point groups, according to an embodiment, are illustrated in FIG. 2C.

The lane detection module 111 may group polylines generated for each feature point group according to a certain condition. As an example, the lane detection module 111 may calculate a distance and an angle between the polylines for each feature point group and may form a polyline group based on polylines, each of which has a similar location and a similar angle as a result of the calculation. The lane detection module 111 may determine whether the polylines meet a third condition below and a fourth condition below to form a polyline group.

<Third Condition>

$$distPoint(Pe_{m-1}, Ps_m) < maxDistThreshold_2$$

Herein, $Pe_{m-1}$ refers to the end point of the m−1th polyline, $PS_m$ refers to the starting point of the mth polyline, distPoint( ) refers to the distance between the two points ($Pe_{m-1}$, $PS_m$), and $maxDistThreshold_2$ refers to the maximum distance reference value for the distance between the end point and the starting point of the two polylines. Herein, $maxDistThreshold_2$ may be set to a value greater than $maxDistThreshold_1$ of the first condition described above.

In other words, if the distance between the end point and the starting point of the two polylines is less than (or close to) a predetermined maximum distance reference value, the lane detection module 111 may determine that the third condition is met.

<Fourth Condition>

$$angLine(\overline{Ps_{m-1}Pe_{m-1}}, \overline{Ps_mPe_m}) < maxAngThreshold_2$$

Herein, $Ps_{m-1}$ refers to the starting point of the m−1th polyline, $Pe_{m-1}$ refers to the end point of the m−1th polyline, $Ps_m$ refers to the starting point of the mth polyline, $Pe_m$ refers to the end point of the mth polyline, $$\overline{Ps_{m-1}Pe_{m-1}}$$

refers to the segment connecting the starting point and the end point of the m−1th polyline, $$\overline{Ps_mPe_m}$$

refers to the segment connecting the starting point and the end point of the mth polyline, angLine( ) refers to the angle formed by the two straight lines $$\overline{Ps_{m-1}Pe_{m-1}} \text{ and } \overline{Ps_mPe_m},$$

and maxAngThreshold$_2$ refers to the maximum angle reference value for the angle formed by the two straight lines. Herein, maxAngThreshold$_2$ may be set to a value greater than maxAngThreshold$_1$ of the second condition described above.

In other words, if the angle formed by the two straight lines $$\overline{Ps_{m-1}Pe_{m-1}},\ \overline{Ps_mPe_m}$$

is less than (or close to) the maximum angle reference value, the lane detection module 111 may determine that the fourth condition is met.

If the distance and the angle between neighboring polylines, among the polylines, meet both the third condition and the fourth condition, the lane detection module 111 may form the polylines to be included in the same group. Polyline groups 235, according to an embodiment, are illustrated in FIG. 2C.

Thus, the lane detection module 111 may detect a lane based on the generated polyline as shown in FIG. 2C. In an embodiment, the lane detection module 111 may recognize and detect polylines included in each polyline group as the same lane.

The error correction module 115 may perform a function of checking an error in the lane detected by the lane detection module 111 and correcting the error.

In an embodiment, the error correction module 115 may assign an instance ID to each lane detected by the lane detection module 111. The error correction module 115 may generate a rectangular region of interest (RoI) based on the starting point and the end point of the respective polylines.

The error correction module 115 may obtain top-left vertex coordinates (or first coordinates) of the rectangular RoI and bottom-right vertex coordinates (or second coordinates) of the rectangular RoI with reference to Equations 1 and 2 below and may generate a rectangular region, which has the first coordinates and the second coordinates as vertices, as the RoI.

$$P_m^{lef\_top} = \{\min(Ps_m^x, Pe_m^x) + \text{margin} \cdot \min(Ps_m^y, Pe_m^y) + \text{margin}\} \quad \text{[Equation 1]}$$

In Equation 1 above, $$P_m^{lef\_top}$$

refers to the top-left vertex coordinate value of the starting point of the rectangular RoI$_m$, $$Ps_m^x$$

refers to the x-coordinate value of the end point of the rectangular RoI$_m$, $$Pe_m^x$$

refers to the x-coordinate value of the starting point of the rectangular RoI$_m$, $$Ps_m^y$$

refers to the y-coordinate value of the starting point of the rectangular RoI$_m$, $$Pe_m^y$$

refers to the y-coordinate value of the end point of the rectangular RoI$_m$, margin.min refers to the minimum margin value of the two points $$(Ps_m^y, Pe_m^y),$$

and margin refers to the margin value.

$$P_m^{right\_bottom} = \{\max(Ps_m^x, Pe_m^x) + \text{margin} \cdot \max(Ps_m^y, Pe_m^y) + \text{margin}\} \quad \text{[Equation 2]}$$

In Equation 2 above, $$P_m^{right\_bottom}$$

refers to the bottom-right vertex coordinates (x2, y2) of the mth rectangular RoI, RoI$_m$, $$Ps_m^x$$

refers to the x-coordinate value of the starting point of the RoI$_m$, $$Pe_m^x$$

refers to the x-coordinate value of the end point of the RoI$_m$, $$Ps_m^y$$

refers to the y-coordinate value of the starting point of the RoI$_m$, $$Pe_m^y$$

refers to the y-coordinate value of the end point of the RoI$_m$, margin.max refers to the maximum margin value of the two points $$(Ps_m^y, Pe_m^y),$$

and margin refers to the margin value. An embodiment of generating the rectangular RoI based on the starting point and the end point of the respective polylines is illustrated in FIG. 3A.

In an embodiment, the error correction module 115 may group the previously generated RoIs according to a certain condition. As an example, the error correction module 115 may form RoIs within a certain distance and angle among the RoIs to be included in the same group. In an embodiment, the error correction module 115 may determine whether the RoIs within the certain distance and angle among the RoIs meet fifth to eighth conditions below to form the RoI group.

<Fifth Condition>

$$distPoint\left(P_i^{left\_top}, P_j^{left\_top}\right) < maxDistThreshold_3$$

Herein, $$P_i^{lef\_top}$$

refer to the top-left vertex coordinates ($X_{i1}$, $Y_{i1}$) of the ith rectangular $RoI_i$, $$P_j^{lef\_top}$$

refers to the top-left vertex coordinates ($X_{j1}$, $Y_{j1}$) of the jth rectangular $RoI_j$, distPoint( ) refers to the distance between the two vertices $$\left(P_i^{left\_top}, P_j^{left\_top}\right),$$

and $maxDistThreshold_3$ refers to the maximum distance reference value for the distance between the two vertices. Herein, $maxDistThreshold_3$ may be set to a value greater than $maxDistThreshold_2$ of the third condition described above.

In other words, if the distance between the two vertices is less than (or close to) the predetermined maximum distance reference value, the error correction module 115 may determine that the fifth condition is met.

<Sixth Condition>

$$distPoint\left(P_i^{right\_bottom}, P_j^{right\_bottom}\right) < maxDistThreshold_3$$

Herein, $$P_i^{right\_bottom}$$

refers to the bottom-right vertex coordinates ($x_{i2}$, $y_{i2}$) of the ith rectangular $RoI_i$, $$P_j^{right\_bottom}$$

refers to the bottom-right vertex coordinates ($X_{j2}$, $Y_{j2}$) of the jth rectangular $RoI_j$, distPoint( ) refers to the distance between the two vertices $$\left(P_i^{right\_bottom}, P_j^{right\_bottom}\right),$$

and $maxDistThreshold_3$ to the maximum distance reference value for the distance between the two vertices. Herein, $maxDistThreshold_3$ may be set to a value greater than $maxDistThreshold_2$ of the third condition described above.

In other words, if the distance between the two vertices is less than (or close to) the predetermined maximum distance reference value, the error correction module 115 may determine that the sixth condition is met.

<Seventh Condition>

$$angLine\left(\overline{P_i^{left\_top}P_i^{right\_bottom}}, \overline{P_j^{left\_top}P_j^{right\_bottom}}\right) < maxAngThreshold_3$$

Herein, $$P_i^{left\_top}P_i^{right\_bottom}$$

refers to the diagonal of the ith ROI, $$\overline{P_j^{left\_top}P_j^{right\_bottom}}$$

refers to the diagonal of the ith ROI, angLine( ) refers to the angle formed by the two straight lines $$\overline{P_i^{left\_top}P_i^{right\_bottom}}, \overline{P_j^{left\_top}P_j^{right\_bottom}},$$

and $maxAngThreshold_3$ refers to the maximum angle reference value for the angle formed by the two straight lines. Herein, $maxAngThreshold_3$ may be set to a value greater than $maxAngThreshold_2$ of the fourth condition described above.

In other words, if the angle formed by the two straight lines (or the RoI diagonal) is less than (or close to) the maximum angle reference value, the error correction module 115 may determine that the seventh condition is met.

<Eighth Condition>

$$85° < \left|angLine\left(\overline{P_i^{left\_top}P_i^{right\_bottom}}, \overline{P_j^{left\_top}P_j^{right\_bottom}}\right)\right| < 95°$$

Herein, $$P_i^{left\_top}P_i^{right\_bottom}$$

refers to the diagonal of the ith RoI, $$\overline{P_i^{left\_top} P_i^{right\_bottom}}$$

refers to the diagonal of the jth RoI, and angLine( ) refers to the angle formed by the two straight lines $$\overline{P_i^{left\_top} P_i^{right\_bottom}}, \overline{P_j^{left\_top} P_j^{right\_bottom}}.$$

In other words, if the angle formed by the two straight lines (or the RoI diagonal) is between 85° and 95°, the error correction module 115 may determine that the eighth condition is met.

The error correction module 115 may form RoIs meeting the fifth to eighth conditions among the RoIs to be included in the is same group. An RoI group, according to an embodiment, illustrated in FIG. 3A.

The error correction module 115 may assign an instance ID to a lane to which each RoI belongs to a lane pixel in the RoI to generate an instance for each lane.

The error correction module 115 may detect a lane detection error based on a length and a width of the instance for each lane. In an embodiment, the error correction module 115 may determine whether the instance for each lane among the instances of the lane meets the ninth condition below and the tenth condition below and may detect a detection error in a certain lane.

<Ninth Condition>

$$distPoint\left(Pixel_i^{left\_top}, Pixel_i^{right\_top}\right) > minLengthThreshold_1$$

Herein, $$Pixel_i^{left\_top}$$

refers to the top-left pixel coordinates of the ith instance, $$Pixel_i^{right\_top}$$

refers to the top-right pixel coordinates of the ith instance, distPoint( ) refers to the distance from the top-left pixel of the instance to the top-right pixel of the instance (or the distance of the instance), and $\text{minLengthThreshold}_1$ refers to the minimum length reference value for the length of the instance.

In other words, if the length of the instance is greater than the predetermined minimum length reference value, the error correction module 115 may determine that the ninth condition is met.

<Tenth Condition>

$$distPoint\left(\text{Pixel}_i^{left\_top}, \text{Pixel}_i^{left\_bottom}\right) > minWidthThreshold_1$$

Herein, $$\text{Pixel}_i^{lef\_top}$$

refers to the top-left pixel coordinates of the ith instance, $$\text{Pixel}_i^{left\_bottom}$$

refers to the bottom-left pixel coordinates of the ith instance, distPoint( ) refers to the distance from the top-left pixel of the instance to the bottom-left pixel of the instance (or the width of the instance), and $\text{minWidthThreshold}_1$ refers to the minimum width reference value for the width of the instance.

In other words, if the width of the instance is greater than the predetermined minimum width reference value, the error correction module 115 may determine that the tenth condition is met.

The error correction module 115 may detect a lane detection error for an instance meeting both the ninth condition and the tenth condition among the instances.

Thus, the error correction module 115 may remove a lane class of semantic segmentation in an RoI including the instance in which the lane detection error is detected.

Furthermore, the error correction module 115 may calculate an average location and an average angle of instances which belong to each RoI group and may correct a location and an angle of each instance. In an embodiment, the error correction module 115 may correct the location and the angle of each instance with reference to Equations 3 and 4 below.

$$distPoint\left(\text{Pixel}_i^{left\_top}, \text{Pixel}_j^{left\_top}\right) := avg\left\{distPoint\left(\text{Pixel}_i^{left\_top}, \text{Pixel}_j^{left\_top}\right)\right\} \quad \text{[Equation 3]}$$

In Equation 3 above, $$\text{Pixel}_i^{lef\_top}$$

refers to the top-left pixel coordinates of the ith instance, $$\text{Pixel}_j^{left\_top}$$

refers to the top-left pixel coordinates of the jth instance, distPoint( ) refers to the distance from the top-left pixel of the ith instance to the top-left pixel of the jth instance, and avg{ } refers to the average value of distPoint.

Thus, the error correction module 115 may calculate an average location of instances which belong to the RoI group with reference to Equation 3 above and may correct a location of each instance based on the calculated average location.

[Equation 4]

$$angLine\left(\overline{\text{Pixel}_i^{left\_top}\text{Pixel}_i^{right\_top}}, \overline{\text{Pixel}_j^{left\_top}\text{Pixel}_j^{right\_top}}\right) :=$$

-continued $$avg\left\{angLine\left(\overline{\text{Pixel}_i^{left\_top}\text{Pixel}_i^{right\_top}},\ \overline{\text{Pixel}_j^{left\_top}\text{Pixel}_j^{right\_top}}\right)\right\}$$

In Equation 4 above, $$\text{Pixel}_i^{lef\_top}$$

refers to the top-left pixel coordinates of the ith instance, $$\text{Pixel}_i^{right\_top}$$

refers to the top-right pixel coordinates of the ith instance, $$\text{Pixel}_j^{left\_top}$$

refers to the top-left pixel coordinates of the jth instance, $$\text{Pixel}_j^{left\_top}$$

refers to the top-right t pixel coordinates of the jth instance, $$\overline{\text{Pixel}_i^{left\_top}\text{Pixel}_i^{right\_top}}$$

refers to the segment connecting the left pixel and the right pixel of the ith instance in the RoI, $$\overline{\text{Pixel}_j^{left\_top}\text{Pixel}_j^{right\_top}}$$

refers to the segment connecting the left pixel and the right pixel of the jth instance in the RoI, angLine( ) refers to the angle formed by the two straight lines $$\overline{\text{Pixel}_i^{left\_top}\text{Pixel}_i^{right\_top}} \text{ and } \overline{\text{Pixel}_j^{left\_top}\text{Pixel}_j^{right\_top}},$$

and avg{angLine( )} refers to the average value of the angles formed by the two straight lines $$\overline{\text{Pixel}_i^{left\_top}\text{Pixel}_i^{right\_top}} \text{ and } \overline{\text{Pixel}_j^{left\_top}\text{Pixel}_j^{right\_top}}.$$

Thus, the error correction module 115 may calculate an average angle of instances which belong to the RoI group with reference to Equation 4 above and may correct an angle of each instance based on the calculated average angle.

FIG. 3B illustrates a lane detection result 321, according to an embodiment. It may be verified that lane misrecognition and an error in lane location and angle occur. Thus, the error correction module 115 may delete a lane class of semantic segmentation in an RoI including an instance in which the lane is misrecognized and may correct a location and an angle of each instance based on an average location and an average angle of the instances in the RoI group, thus obtaining corrected lane detection data 325.

In an embodiment, the error correction module 115 may update semantic segmentation data based on the location and the angle of the instance, which are corrected with reference to Equations 3 and 4 above.

If the semantic segmentation data is updated, the processor 110 may train the semantic segmentation deep learning model based on the updated semantic segmentation data. Thus, the lane detection module 111 may detect a lane based on the semantic segmentation deep learning model trained based on the updated semantic segmentation data.

A more detailed description of operational flow of a lane detection apparatus, according to an embodiment, is provided below with reference to FIGS. 4 and 5.

Figure 4:
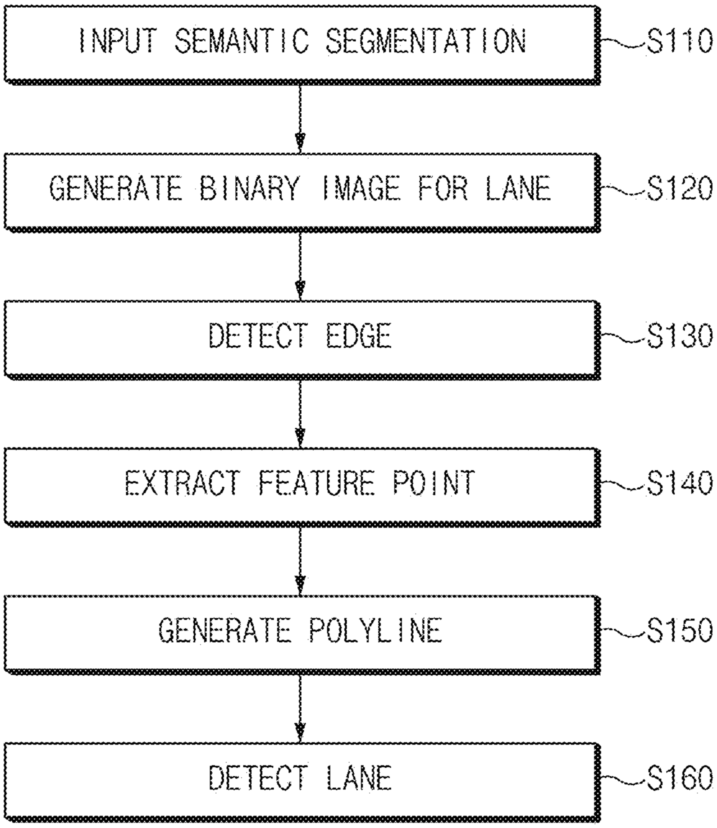
FIGS. 4 and 5 are drawings illustrating operational flow for a lane detection operation according to an embodiment of the present disclosure.
Figure 5:
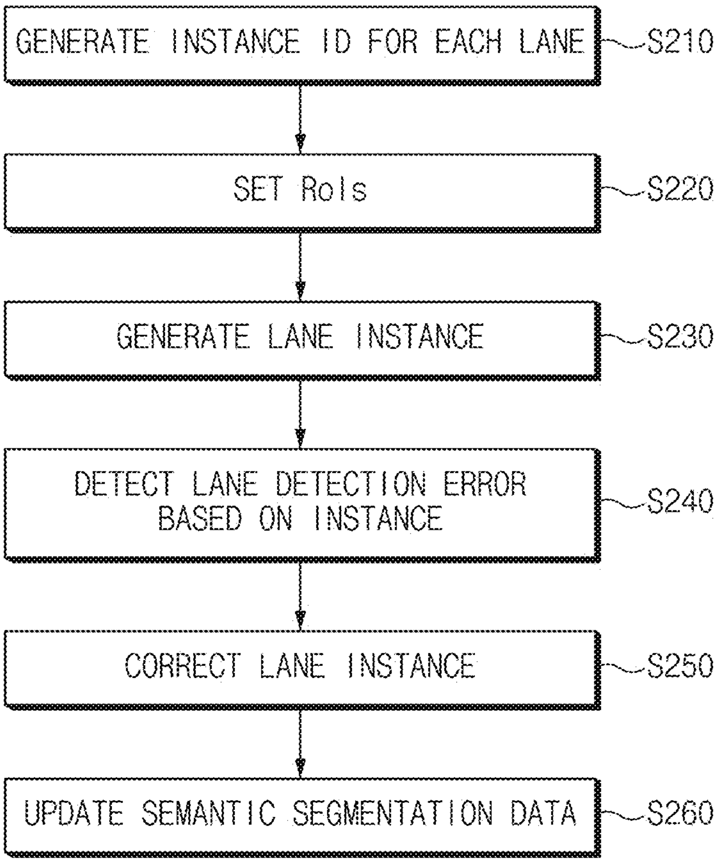

FIGS. 4 and 5 are drawings illustrating operational flow for a lane detection method according to an embodiment of the present disclosure. FIG. 4 illustrates a lane detection operation according to an embodiment. FIG. 5 illustrates a lane error correction operation according to an embodiment. Hereinafter, it is assumed that a lane detection apparatus 100 of FIG. 1 performs processes of FIGS. 4 and 5. Furthermore, in descriptions of FIGS. 4 and 5, it may be understood that an operation described as being performed by a lane detection apparatus 100 is controlled by a processor 110 of the lane detection apparatus 100.

Referring to FIG. 4, semantic segmentation is input in an operation S110. In an operation S120, the lane detection apparatus 100 may separate a lane class region from the semantic segmentation input in the operation S110 to generate a binary image for a lane.

In an operation S130, the lane detection apparatus 100 may detect an edge for each lane region from the binary image generated in the operation S120. In an operation S140, the lane detection apparatus 100 may extract a feature point of each lane on the basis of the edge of each lane region detected in the operation S130. In an operation S140, the lane detection apparatus 100 may extract an intermediate point in a width direction of a corresponding lane as the feature point, on the basis of the edge of each lane region. In an embodiment, the lane detection apparatus 100 may sequentially extract a feature point at a certain interval in a length direction of the lane.

In an operation S150, the lane detection apparatus 100 may generate a polyline based on the feature points extracted in the operation S140. In an operation S160, the lane detection apparatus 100 may detect a lane based on the polyline generated in the operation S150.

In the operation S150, the lane detection apparatus 100 may calculate a distance and an angle between feature points for each lane region, may form a feature point group based on feature points that have a similar location and a similar angle, and may generate a polyline for each feature point group.

In an operation S160, the lane detection apparatus 100 may calculate a distance and an angle between the polylines to form a polyline group based on polylines that have a similar location and a similar angle, and may recognize and detect polylines included in each polyline group as the same lane.

Referring to FIG. 5, the lane detection apparatus 100 may check a lane detection error among the lanes detected via the operations of FIG. 4 and may correct the lane detection error.

In an operation S210, the lane detection apparatus 100 may generate an instance ID in response to each lane.

In an operation S220, the lane detection apparatus 100 may set rectangular RoIs using a starting point and an end point of the polylines. In an embodiment, the lane detection apparatus 100 may generate an RoI group according to a certain condition. As an example, the lane detection apparatus 100 may generate RoIs within a certain distance and a certain angle among the RoIs as the same RoI group.

In an operation S230, the lane detection apparatus 100 may assign an instance ID for a lane to which the RoI set in the operation S220 belongs to a lane pixel that belongs to the RoI to generate a lane instance.

In an operation S240, the lane detection apparatus 100 may detect a lane detection error based on the instance for each lane. In an embodiment, the lane detection apparatus 100 may detect the lane detection error based on a length and a width of the instance for each lane.

For example, if the length of the instance for each lane meets a predetermined minimum length (e.g., is greater than a predetermined minimum length reference value) and the width of the instance meets a predetermined minimum width criterion (e.g., is greater than a predetermined minimum width reference value), the lane detection apparatus 100 may detect a lane detection error in the instance.

If the lane detection error in the instance is detected in the operation S240, then in an operation S250, the lane detection apparatus 100 may correct a lane instance in which the error is detected.

As an example, the lane detection apparatus 100 may remove a lane class of semantic segmentation in an RoI including the instance in which the lane detection error is detected, thus correcting the lane detection error.

Furthermore, the lane detection apparatus 100 may calculate an average location and an average angle of instances which belong to each RoI group and may correct a location and an angle of each instance.

In an operation S260, the lane detection apparatus 100 may update semantic segmentation data based on the lane instance corrected in the operation S250.

In an embodiment, the lane detection apparatus 100 may train a semantic segmentation deep learning model based on the semantic segmentation data updated in the operation S260 and may detect a lane based on the trained semantic segmentation deep learning model.

Figure 6:
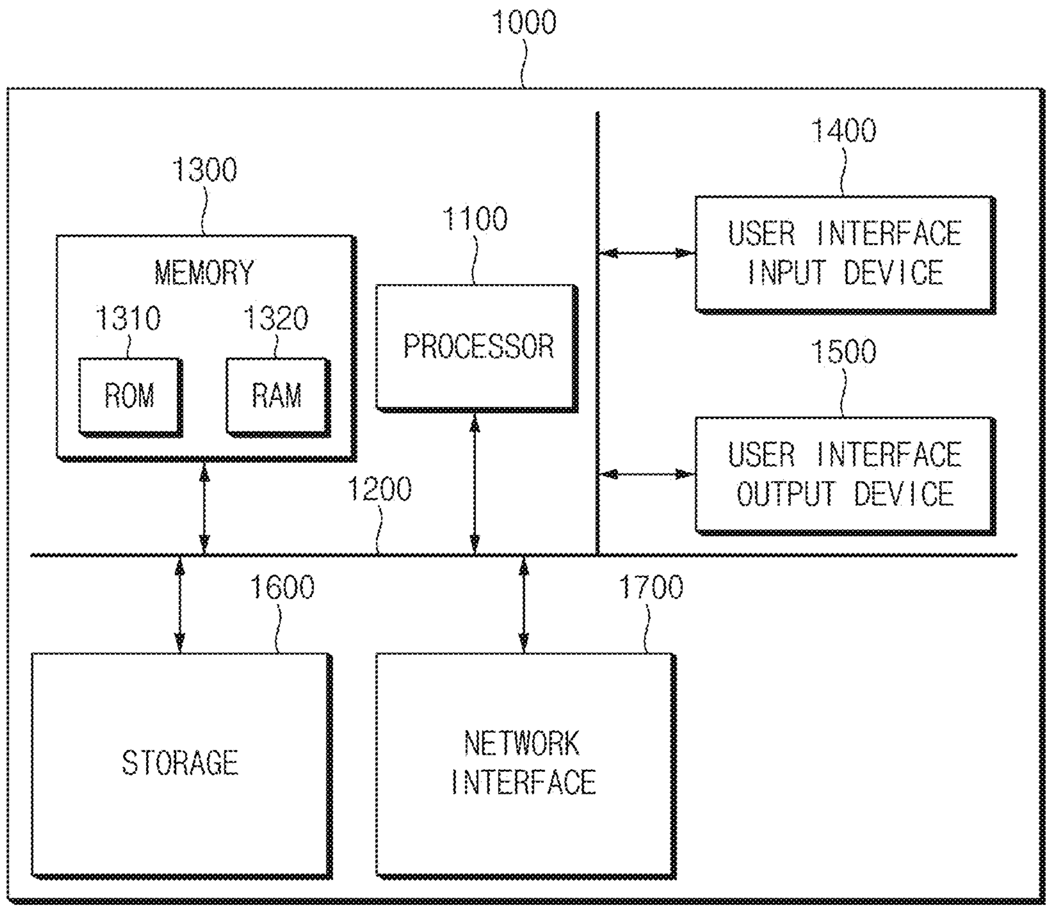
FIG. 6 is a drawing illustrating a computing system according to an embodiment of the present disclosure.

FIG. 6 illustrates a computing system according to an embodiment of the present disclosure.

Referring to FIG. 6, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another embodiment, the processor and the storage medium may reside in the user terminal as separate components.

As described above, the lane detection apparatus and the method thereof according to embodiments of the present disclosure may detect a lane based on semantic segmentation data including semantic information for the lane and may generate one or more instances for the detected lane to facilitate lane detection error detection. The lane detection apparatus and the method thereof may remove an incorrectly detected lane or may correct a location and an angle of the instance based on a lane instance, if detecting a lane detection error based on the instance for the lane, and may update semantic segmentation, thus improving the accuracy of lane detection and minimizing cost and time required to construct data.

According to an embodiment of the present disclosure, the lane detection apparatus may detect a lane based on semantic segmentation data including semantic information about the lane and may generate an instance for the detected lane, thus easily detecting a lane detection error.

Furthermore, according to an embodiment of the present disclosure, the lane detection apparatus may remove a misrecognized lane or may correct a location and an angle of an instance for the lane based on a lane instance to update semantic segmentation, if detecting the lane detection error based on the instance, thus improving the accuracy of lane detection and minimizing cost and time required to construct data.

In some embodiments, the lane detection technology may be used for assisting a driver based on lane detection using a camera in a vehicle, in a situation in which it is difficult to identify a lane using the naked eye at night. Furthermore, in some embodiments, the lane detection technology is used to identify a driving situation during autonomous driving of a vehicle.

Hereinabove, although the present disclosure has been described with reference to example embodiments and the accompanying drawings, the present disclosure is not limited thereto. Rather, the present disclosure may be variously modified and altered by those having ordinary skill in the art to which the present disclosure pertains without departing from the spirit and scope of the present disclosure claimed in the following claims.

Accordingly, embodiments of the present disclosure are intended not to limit but to explain the technical idea of the present disclosure, and the scope and spirit of the disclosure is not limited by the above embodiments. The scope of the present disclosure should be construed on the basis of the accompanying claims, and all the technical ideas within the scope equivalent to the claims should be included in the scope of the present disclosure.

What is claimed is:

1. A lane detection apparatus, comprising:

storage configured to store data and computer-readable instructions; and a processor configured to execute the computer-readable instructions to:

generate a lane image based on semantic segmentation data including semantic information for a lane;

detect the lane using a plurality of feature points extracted from the lane image;

generate one or more instances for the lane; and correct a lane detection error by calculating a geometric average of instances belonging to a polyline-based region of interest generated using the plurality of feature points, and correcting the instances, belonging to the polyline-based region of interest, based on the geometric average of the instances.

2. The lane detection apparatus of claim 1, wherein the processor is configured to:

set regions of interest for the lane based on a starting point and an end point of polylines generated using the plurality of feature points; and assign an instance ID to lane pixels in a region of interest to generate an instance for the lane.

3. The lane detection apparatus of claim 2, wherein the processor is configured to detect the lane detection error based on a length and a width of an instance, among the one or more instances, generated for the lane.

4. The lane detection apparatus of claim 3, wherein the processor is configured to detect the lane detection error for an instance, among the one or more instances, meeting i) a first condition in which an instance length from a top-left pixel of the instance to a top-right pixel of the instance meets a predetermined minimum length criterion and ii) a second condition in which an instance width from the top-left pixel of the instance to a bottom-left pixel of the instance meets a predetermined minimum width criterion.

5. The lane detection apparatus of claim 4, wherein the processor is configured to remove lane classes of semantic segmentation in a region of interest, among the regions of interest, that includes an instance in which the lane detection error is detected.

6. The lane detection apparatus of claim 2, wherein the processor is configured to generate a region of interest group based on a distance and an angle between the regions of interest, wherein generating the region of interest group includes including regions of interest within a certain distance and a certain angle in the region of interest group.

7. The lane detection apparatus of claim 6, wherein the processor is configured to identify two regions of interest, among the regions of interest, as neighboring regions of interest based on determining that i) a distance between vertices of the two regions of interest is within the certain distance and ii) an angle formed by diagonals of the two regions of interest is within a certain angle range.

8. The lane detection apparatus of claim 6, wherein the processor is configured to:

calculate an average location and an average angle of instances belonging to the region of interest group; and correct a location and an angle of each of the instances belonging to the region of interest group.

9. The lane detection apparatus of claim 2, wherein the processor is configured to:

set the regions of interest to rectangles;

determine top-left vertex coordinates for each of the regions of interest based on a smaller value between an x-coordinate of the starting point of the polylines and an x-coordinate of the end point of the polylines and a minimum margin value of a y-coordinate of the starting point of the polylines and a y-coordinate of the end point of the polylines; and determine bottom-right vertex coordinates for each of the regions of interest based on a larger value between the x-coordinate of the starting point of the polylines and the x-coordinate of the end point of the polylines and a maximum margin value of the y-coordinate of the starting point of the polylines and the y-coordinate of the end point of the polylines.

10. The lane detection apparatus of claim 1, wherein the processor is configured to:

update the semantic segmentation data based on an instance, among the one or more instances, in which the lane detection error is corrected;

train a semantic segmentation deep learning model based on the updated semantic segmentation data; and detect the lane based on the trained semantic segmentation deep learning model.

11. A lane detection method, comprising:

generating a lane image based on semantic segmentation data including semantic information for a lane;

detecting the lane using a plurality of feature points extracted from the lane image;

generating one or more instances for the lane; and correcting a lane detection error by calculating a geometric average of instances belonging to a polyline-based region of interest generated using the plurality of feature points, and correcting the instances, belonging to the polyline-based region of interest, based on the geometric average of the instances.

12. The lane detection method of claim 11, wherein generating the one or more instances for the lane includes:

setting regions of interest for the lane based on a starting point and an end point of polylines generated using the plurality of feature points; and assigning an instance ID to lane pixels in a region of interest to generate an instance, among the one or more instances, for the lane.

13. The lane detection method of claim 12, further comprising detecting the lane detection error based on a length and a width of an instance, among the one or more instances, generated for the lane.

14. The lane detection method of claim 13, wherein detecting the lane detection error includes detecting the lane detection error for an instance, among the one or more instances, meeting i) a first condition in which an instance length from a top-left pixel of the instance to a top-right pixel of the instance meets a predetermined minimum length criterion and ii) a second condition in which an instance width from the top-left pixel of the instance to a bottom-left pixel of the instance meets a predetermined minimum width criterion.

15. The lane detection method of claim 13, wherein correcting the lane detection error includes removing lane classes of semantic segmentation in a region of interest, among the regions of interest, that includes an instance in which the lane detection error is detected.

16. The lane detection method of claim 12, further comprising generating a region of interest group based on a distance and an angle between the regions of interest, wherein generating the region of interest group includes including regions of interest within a certain distance and a certain angle in the region of interest group.

17. The lane detection method of claim 16, wherein generating the region of interest group includes identifying two regions of interest, among the regions of interest, as neighboring regions of interest based on determining that i) a distance between vertices of the two regions of interest is within the certain distance and ii) an angle formed by diagonals of the two regions of interest is within a certain angle range.

18. The lane detection method of claim 16, wherein correcting the lane detection error includes:

calculating an average location and an average angle of instances belonging to the region of interest group; and correcting a location and an angle of each of the instances belonging to the region of interest group.

19. The lane detection method of claim 12, wherein setting the region of interest includes:

determining top-left vertex coordinates for each of the regions of interest based on a smaller value between an x-coordinate of the starting point of the polylines and an x-coordinate of the end point of the polylines and a minimum margin value of a y-coordinate of the starting point of the polylines and a y-coordinate of the end point of the polylines; and determining bottom-right vertex coordinates for each of the regions of interest based on a larger value between the x-coordinate of the starting point of the polylines and the x-coordinate of the end point of the polylines and a maximum margin value of the y-coordinate of the starting point of the polylines and the y-coordinate of the end point of the polylines.

20. The lane detection method of claim 11, further comprising:

updating the semantic segmentation data based on an instance, among the one or more instances, in which the lane detection error is corrected;

training a semantic segmentation deep learning model based on the updated semantic segmentation data; and detecting the lane based on the trained semantic segmentation deep learning model.

* * * * *